United States Patent [19]

Omori et al.

[11] Patent Number: 4,569,921

[45] Date of Patent: Feb. 11, 1986

[54] SINTERED SILICON CARBIDE MOLDING AND PROCESS FOR PRODUCTION THEREOF

[76] Inventors: Mamoru Omori, 18-1 Kano 2-chome, Sendai-shi, Miyagi 982; Keigo Ohira, Kaisha 8-4 Koamicho, Nihonbashi, Chuo-ku, Tokyo 104, both of Japan

[21] Appl. No.: 708,117

[22] Filed: Mar. 5, 1985

Related U.S. Application Data

[63] Continuation-in-part of Ser. No. 515,607, Jul. 20, 1983, abandoned.

[30] Foreign Application Priority Data

Jul. 29, 1982 [JP] Japan ................................ 57-131256

[51] Int. Cl.$^4$ ............................................... C04B 35/56
[52] U.S. Cl. ....................................... 501/88; 501/89; 501/152

[58] Field of Search ...................... 501/88, 89, 90, 152

[56] References Cited

FOREIGN PATENT DOCUMENTS 0160970 4/1982 Japan .

*Primary Examiner*—Mark L. Bell
*Attorney, Agent, or Firm*—Balogh, Osann, Kramer, Dvorak, Genova & Traub

[57] ABSTRACT

Sintered silicon carbide moldings produced by using as a sintering aid a composition comprising oxide(s) of at least one element selected from the group consisting of Li, Be, Mg, Si, Ca, Ti, V, Cr, Mn, Fe, Co, Ni, Zn, Sr, Zr, Nb, Mo, Ba, Tc, Ta, W and Th in addition to known sintering aids used for the production of sintered silicon carbide moldings, such as rare earth element oxides, boron oxide and aluminum oxide, and a process for production thereof.

2 Claims, No Drawings

SINTERED SILICON CARBIDE MOLDING AND PROCESS FOR PRODUCTION THEREOF

This application is a continuation-in-part of application Ser. No. 515,607, filed July 20, 1983, now abandoned.

BACKGROUND OF THE INVENTION

1. Field of the Invention

The present invention relates to a high strength sintered silicon carbide molding.

More particularly, the present invention relates to a high strength sintered silicon carbide molding containing a rare earth element oxide and at least one member selected from the group consisting of oxides of aluminum, boron, beryllium, magnesium, calcium, titanium, vanadium, chromium, manganese, iron, cobalt, nickel, zinc, strontium, zirconium, niobium, molybdenum, technetium, barium, tantalum, tungsten and thorium in addition to starting materials used in the sintered silicon carbide molding disclosed in the inventors' prior Japanese Patent Application No. 44109/1981 (Laid-Open No. 160970/1982).

2. Description of the Prior Art

Because of its excellent high-temperature strength, thermal shock resistance, oxidation resistance, abrasion resistance and creep resistance, silicon carbide has been used for the production of heat-resistant moldings and heating elements for attaining a high temperature. Recently, the use of silicon carbide in the fields of high-temperature structural materials and abrasion-resistant materials has been increased remarkably.

However, it is difficult to obtain a sintered molding having a high denseness and strength from silicon carbide (hereinafter referred to as "SiC") per se, since SiC is difficultly sinterable. Therefore, in the production of such a sintered molding, there has been employed a process wherein $Al_2O_3$, iron oxide, AlN, BeO, Be, B, $B_4C$, BN, Al or $AlPO_4$ is incorporated as a sintering aid in the molding material and the mixture is hot-pressed or a reactive sintering process wherein a molding obtained from a powdery mixture of SiC with carbon is reacted with molten or gaseous silicon. However, the production of moldings having complicated shapes is difficult according to these processes and these processes are unsuitable for mass production. In addition, a non-compression sintering process has been proposed and employed recently as the most excellent process for the production of sintered SiC moldings. This process comprises adding carbon and boron as sintering aids to SiC powder, molding the mixture and sintering the resulting moldings without applying pressure as disclosed in, for example, the specification of U.S. Pat. No. 3,993,602.

In this process, boron carbide formed by the reaction of boron with carbon accelerates sintering of silicon carbide powder in the silicon carbide moldings. It has been known that even if an oxide used as the sintering aid in a hot press process is used in the non-compression sintering process, the sintering-accelerating effect cannot be obtained at all. Generally, it has been considered that oxides are rather harmful to the non-compression sintering of silicon carbide.

The inventors previously found that rare earth element oxides, aluminum oxide and boron oxide are effective as sintering aids for silicon carbide. An invention attained on the basis of this finding was applied for patent as described above (Japanese Patent Laid-Open No. 160970/1982).

SUMMARY OF THE INVENTION

After further investigations, the inventors have found that by using rare earth element oxides, boron oxide and aluminum oxide in combination with heretofore unknown sintering aids, the sintering of SiC powder can be accerelated and properties of the resulting sintered SiC moldings, such as tenacity, can be improved. An object of the invention is to provide a new sintered SiC molding and a process for production thereof based on this finding. The object of the invention can be attained by providing the following sintered SiC moldings (1) and (2) and production process (3):

(1) a sintered silicon carbide molding consisting of 0.30 to 30.00 weight % of member(s) of the following group (a), 0.30 to 30.00 weight % of member(s) of the following group (b) the sum of members of groups (a) and (b) being not more than 40 weight % and the balance substantially consisting of SiC:

group (a): oxide(s) of at least one element selected from the group consisting of Sc, Y, La, Ce, Pr, Nd, Sm, Eu, Gd, Tb, Dy, Ho, Er, Tm, Yb, Pm and Lu, and group (b): oxide(s) of at least one element selected from the group consisting of Be, Mg, Ca, Ti, V, Cr, Mn, Fe, Co, Ni, Zn, Sr, Zr, Nb, Mo, Ba, Tc, Ta, W and Th.

(2) A sintered silicon carbide molding consisting of 0.30 to 30.00 weight % of member(s) of the following group (a), 0.30 to 30.00 weight % of member(s) of the following group (b), 0.30 to 10 weight % of member(s) of the following group (c) the sum of members of the groups (a), (b) and (c) being not more than 40 weight % and the balance substantially consisting of SiC:

group (a): oxide(s) of at least one element selected from the group consisting of Sc, Y, La, Ce, Pr, Nd, Sm, Eu, Gd, Tb, Dy, Ho, Er, Tm, Yb, Pm and Lu, group (b): oxide(s) of at least one element selected from the group consisting of Be, Mg, Ca, Ti, V, Cr, Mn, Fe, Co, Ni, Zn, Sr, Zr, Nb, Mo, Ba, Tc, Ta, W and Th, and group (c): oxide(s) of at least one of elements Al and B.

(3) a process for producing a sintered silicon carbide molding by adding at least one sintering aid selected from the following groups (I) and (II) to silicon carbide powder characterized in that the amounts of Ⓐ, Ⓑ and Ⓒ satisfying the following formula are adjusted to 0.30 to 30.00% by weight, 0.30 to 30.00% by weight, and 0.30 to 10.00% by weight, respectively:

$$Ⓐ + Ⓑ + Ⓒ + SiC = 100 \text{ weight \%}$$

wherein:

Ⓐ represents the amount of an element (as oxide) of group (a),

Ⓑ represents the amount of an element (as oxide) of group (b), and

Ⓒ represents the amount of an element (as oxide) of group (c), to prepare a mixture and the resulting mixture is molded and sintered in separated steps or simultaneously:

(I) a sintering aid comprising up to 99.9 wt. % of member(s) of the following group (a) and the balance substantially consisting of member(s) of the following group (b), and (II) a sintering aid comprising up to 99.9 wt. % of member(s) of the following group (a), up to 99 wt. % of member(s) of the following group (c) and the balance substantially consisting of member(s) of the following group (b):

group (a): at least one member selected from the group consisting of elements of Sc, Y, La, Ce, Pr, Nd, Sm, Eu, Gd, Tb, Dy, Ho, Er, Tm, Yb, Pm and Lu and compounds of them, group (b): at least one member selected from the group consisting of elements of Be, Mg, Ca, Ti, V, Cr, Mn, Fe, Co, Ni, Zn, Sr, Zr, Nb, Mo, Ba, Tc, Ta, W and Th and compounds of them, and group (c): at least one member selected from the group consisting of elements of Al, B and C and compounds of them.

DESCRIPTION OF THE PREFERRED EMBODIMENTS

The sintered SiC molding of the first invention consisting of 0.30 to 30.00 weight % of at least one rare earth element oxide (hereinafter referred to as "R oxide"), 0.30 to 30.00 weight % of at least one metal element oxide (hereinafter referred to as "M oxide") selected from the group shown below, the sum of R oxide and M oxide being not more than 40 weight % and the balance substantially consisting of SiC.

The R oxide(s) is(are) selected from the group consisting of oxides of Sc, Y, La, Ce, Pr, Nd, Sm, Eu, Gd, Tb, Dy, Ho, Er, Tm, Yb, Pm and Lu. The M oxide(s) is(are) selected from the group consisting of oxides of Be, Mg, Ca, Ti, V, Cr, Mn, Fe, Co, Ni, Zn, Sr, Zr, Nb, Mo, Ba, Tc, Ta, W and Th. It is considered that these oxides have functions of reducing the surface energy of the SiC powder to accelerate the sintering reaction and to combine the SiC molecules with one another.

The inventors examined high-temperature oxidation resistances of known sintered SiC moldings formed by using carbon and boron as sintering aids and molded products of the above-mentioned first invention. As a result, the molded products containing the oxides of the present invention exhibited only a slight weight increase, while the weight of the known products was increased at least about 2-fold. Deterioration in strength of the sintered moldings of the first invention at a high temperature is negligible. When the sintered moldings were treated at 1350° C. in air for 100 h, the strength was hardly deteriorated. However, the strength of the conventional sintered moldings was reduced to a half. Particularly, as compared with known sintered moldings containing only R oxide, the sintered moldings of the present invention obtained by using zirconia as the sintering aid have a higher tenacity and less scattering in properties among the samples and the latter has an m value determined from Weibull-plot of at least 10 and an average bending strength of 1.4 times as high as that of the former.

The R oxide content of the sintered molding of the first invention should be controlled in the range of 0.30 to 30.00 weight %, since when it is less than 0.30 weight %, the strength of the molded product is insufficient, while when it is more than 30.00 weight %, the SiC content of the sintered molding becomes too low. Further, the M oxide content of the sintered molding should be controlled in the range of 0.30 to 30.00 weight %, since when it is less than 0.30 weight %, no difference from a sintered molding containing only R oxide as the sintering aid can be found, whereas when it exceeds 30.00 weight %, the SiC content of the sintered molding becomes too low.

As compared with the known sintered moldings containing $Al_2O_3$ or AlN or both R oxide and $Al_2O_3$, the sintered SiC moldings of the second invention containing R oxide, aluminum oxide (hereinafter referred to as Al oxide) and M oxide (and particularly zirconia) have a higher tenacity and less scattering in properties among the samples and the latter has an m value of as high as at least 12 and an average bending strength of 1.4 times as high as that of the former.

As compared with the known sintered moldings containing boron and carbon as sintering aid or R oxide and boron oxide (hereinafter referred as "B oxide"), the sintered SiC moldings of the second invention containing R oxide, B oxide and M oxide, particularly those containing zirconia, have a higher tenacity and the latter has a m value of as high as at least 14, an average bending strength of 1.3 times as high as that of the former and excellent creep properties.

The sintered moldings of the second invention containing Al oxide, B oxide, M oxide and R oxide have a high-temperature strength of at least 5 times as high as that of sintered SiC products obtained by using a boron-containing glass and a working limit of temperature of several hundred degrees higher than that of the latter. As compared with known products containing R oxide, Al oxide and B oxide, the sintered moldings of the present invention (particularly those containing zirconia) containing M oxide have a far more improved tenacity, an m value of at least 10, less scattering in the strength among the samples and an average bending strength of 1.5 times as high as that of the former.

The R oxide content of the sintered molding of the second invention should be controlled in the range of 0.30 to 30.00 weight %, since when it is less than 0.30 weight %, the strength of the product is insufficient while when it is more than 30.00 weight %, the SiC content of the sintered molding becomes too low.

The amount of at least one of oxides of Al and B should be controlled to up to 10.00 weight %, since when it exceeds 10.00 weight %, the SiC content of the sintered molding becomes too low.

The amount of M oxide should be controlled in the range of 0.30 to 30.00 weight %, since when it is less than 0.30 weight %, the improvement in the properties, particularly tenacity, of the sintered SiC moldings is insignificant, while when it is more than 30.00 weight %, the SiC content of the sintered molding becomes too low.

The sum of R oxide, M oxide and oxides of Al and B should be controlled not more than 40.00 weight %.

The process for producing the sintered SiC moldings of the present invention will now be described.

According to the present invention, at least one of α-SiC, β-SiC and amorphous SiC may be used.

It has been found that when a mixture of at least one of finely divided β-SiC and amorphous SiC with 0.1 to 10 wt. % of α-SiC is used as the starting material, the nonuniform growth of the SiC particles can be controlled and, therefore, the high-temperature strength and creep resistance can be improved.

Further, compounds having Si-C bonds, such as organosilicon compounds and high-molecular organosilicon compounds, can also be used as they are or in the form of a mixture with the SiC powder as the starting SiC material.

According to the present invention, the following sintering aids (I) and (II) may be used:

(I) a sintering aid comprising up to 99.9 wt. % of member(s) of the following group (a) and the balance substantially consisting of member(s) of the following group (b), and (II) a sintering aid comprising up to 99.9 wt. % of member(s) of the following group (a), up to 99 wt. % of member(s) of the following group (c) and the balance substantially consisting of member(s) of the following group (b):

group (a): at least one member selected from the group consisting of elements of Sc, Y, La, Ce, Pr, Nd, Sm, Eu, Gd, Tb, Dy, Ho, Er, Tm, Yb, Pm and Lu and compounds of them, group (b): at least one member selected from the group consisting of elements of Be, Mg, Ca, Ti, V, Cr, Mn, Fe, Co, Ni, Zn, Sr, Zr, Nb, Mo, Ba, Tc, Ta, W and Th and compounds of them, and group (c): at least one member selected from the group consisting of elements of Al, B and C and compounds of them.

As the compounds of the elements of the above-mentioned groups (a), (b) and (c), there may be used oxides, compound oxides, hydroxides, acid adducts of hydroxides, phosphates, carbonates, basic carbonates, nitrates, sulfates, organic acid salts, halides, organometallic compounds, coordination compounds and alcoholates of them.

Among these sintering aids, the acid adducts of hydroxides are synthesized by reacting a hydroxide with an acid. When the hydroxide is reacted with the acid in an amount smaller than that equivalent to the metal element in the hydroxide, an acid adduct wherein the acid has been reacted with part of the metal element in the hydroxide is formed and the product is soluble in water.

The acids used herein include hydrochloric, nitric, sulfuric, hydrofluoric, phosphoric, perchloric, carbonic, and organic acids (such as formic, acetic, propionic, tartaric, fumaric, lactic, oxalic, stearic, maleic, benzoic, malic, malonic, citric, and butyric acids).

The following four processes are effective for obtaining the mixture of silicon carbide powder with the sintering aid used as the starting material for the sintered moldings: a first process comprises mixing a solvent-insoluble sintering aid (such as oxide, hydroxide or metal element) with the silicon carbide powder. When a dry mixing technique requiring no liquid is employed, the mixing is completed by mixing them in a mixer for a time required for effecting thorough mixing. In a wet mixing technique, the powders are mixed with a solvent such as water or alcohol in a mixer for a time required for effecting thorough mixing. A second process is employed when the sintering aid (such as an acid adduct of hydroxide, nitrate, sulfate, organic acid salt, basic carbonate, carbonate, phosphate, perchlorate, halide, organo-metallic compound, alcoholate or coordination compound) is soluble in a solvent. In this process, the sintering aid is dissolved in a solvent therefor, such as water, an alcohol, ether, ketone, hydrocarbon, DMSO or DMF and the resulting solution is mixed with the silicon carbide powder in a mixer for a time required for effecting thorough mixing. By this mixing process, the surface of the silicon carbide powder can be coated with a thin film of the sintering aid and, therefore, great sintering effects can be obtained even with a small amount of the sintering aid. Now, description will be made on the relationships between the solvents and the sintering aids soluble therein. The acid adducts of the hydroxides are soluble in water. Some alcoholates are soluble in ethers and aromatic hydrocarbons. Some complexes are soluble in water, alcohols, ethers and hydrocarbons. The organo-metallic compounds are soluble in organic solvents such as hydrocarbons and ethers. Some of the nitrates, sulfates, organic acid salts and halides are soluble in water. A third process is one employed when a sintering aid which is liquid at room temperature or which can be liquefied by heating (such as some of the organometallic compounds, complexes and organic acid salts) is used. In this process, the sintering aid is mixed with the silicon carbide powder and the mixture is stirred in a mixer at room temperature or elevated temperature under heating until thorough stirring has been effected. A fourth process comprises a combination of the first, second and third processes. In this process, for example, component(s) insoluble in a solvent and a solution of sintering aid(s) are mixed with the silicon carbide powder.

In this process, any mixing machine generally used for mixing or blending powders may be used.

The mixing may be effected in an oxidizing gas atmosphere of at least one of air, carbon dioxide and oxygen gas; a non-oxidizing gas atmosphere of at least one of nitrogen, argon, helium, hydrogen, neon, carbon monoxide and hydrocarbons; or under vacuum. It is the easiest process to mix them in air. In case the mixing is effected in air, some of the organometallic compounds, alcoholates and complexes and the halides react with oxygen, carbon dioxide or water in the course of the mixing to form oxides, hydroxides or carbonates. Ultra fine particles of these compounds adhere to the surface of the silicon carbide powder particles to improve the sintering-accelerating effect.

The mixture of the starting materials obtained as above is molded into a desired shape. In the molding step, any conventional molding technique generally employed in the industrial fields in which powders are used, such as ceramic industry, may be employed to obtain unsintered moldings.

When a starting mixture of the sintering aid in the form of powder with the silicon carbide powder is used, about 1 wt. % of a lubricating agent such as stearic acid or a salt thereof may be applied to the mold for facilitating the press molding advantageously.

In the molding step, the pressure may be applied by means of an ordinary single-force press, double-force press, hydrostatic pressure press, etc. Moldings having simple shapes can be sent to the next treatment step directly after the compression. However, moldings having complicated shapes should be treated by grinding or milling so as to regulate the shapes after the pressmolding. In case a high strength is required of the moldings for the shape regulation, they may be preformed at a temperature in the range of 300° to 1600° C. in an oxidizing or non-oxidizing atomsphere or in vacuum. Further, the starting mixture may be slip-cast. When the solvent is not used in the mixing step, it is preferred to use water as a dispersion medium in the slip-casting step. An anticoagulant is added and then silicon carbide powder and the sintering aid are added thereto and they are mixed for several hours to obtain a starting material for the slip-casting. On the other hand, when a solvent is used in the mixing step, the quantity of this solvent is increased to directly obtain the starting material for the slip-casting. The resulting starting material for the slip-casting may be poured into a mold made of calcined gypsum according to a conventional slip casting technique to obtain an unsintered molding. The starting silicon carbide mixture in the form of a paste may be subjected to extrusion injection molding. In the preparation of the paste, a binder is used advantageously in addition to the solvent. As the binders, there may be effectively used substances which volatilize in the sintering step without leaving any residue, such as polyvinyl alcohol, polyethylene glycol and wax. When the solution per se of the sintering aid is viscous, i.e., when the acid adduct of the hydroxide is used, an excellent paste may be obtained without using any binder. In this case, the sintering aid serves also as the binder, and the acid adduct of the hydroxide makes the paste viscous and also serves as the sintering aid in the calcination.

According to the present invention, the above-mentioned unsintered SiC molding is calcined in the next step. A furnace used for the calcination is an ordinary calcination furnace. It is convenient to use a furnace in which the atmosphere can be altered to an oxidizing or non-oxidizing atmosphere or to vacuum. The calcination temperature is in the range of 1600° to 2300° C. At a temperature below 1600° C., the sintering reaction hardly proceeds, while at above 2300° C., the SiC decomposition becomes vigorous unfavorably. The sintering of the silicon carbide molding can be completed in this temperature range. However, when the sintering aid is used in a large amount, the sintering can be completed at a relatively low temperature. The calcination may be effected in two separate steps, i.e., low-temperature and high-temperature calcination steps, since the calcination temperature is as high as at least 1600° C. The two-step calcination is advantageous particularly when the molding is large in size or when the sintering aid emits a gas during the calcination. The calcination is effected desirably in a non-oxidizing atmosphere or in vacuum when a high temperature is employed. As the non-oxidizing atmosphere, there may be used nitrogen containing little oxygen, argon, helium, neon, hydrogen or carbon monoxide, or an atmosphere surrounded by carbon or SiC. Though the pressure of the atmospheric gas is preferably high, it is economically disadvantageous. Favorable results can be obtained even under a pressure of up to 1 atm. On the other hand, the non-oxidizing atmosphere or vacuum is not always required in the low-temperature calcination. When the calcination is effected at a temperature of up to 1300° C. at which the oxidation of silicon carbide is not vigorous, an oxidizing atmosphere such as air may be employed. If a sintering aid other than an oxide is used in this reaction, it reacts during the calcination to form an oxide. However, the conversion of the sintering aid into the oxide during the low-temperature calcination is not unfavorable, since the sintering aid exhibits its maximum effect when it is in the form of the oxide. When the elements or compounds thereof in the above-mentioned groups (a), (b) and (c) are used as the components of the sintering aid, it is impossible to perfectly prevent the oxidation of them at a high temperature and they are oxidized either partially or wholly. Even in this case, no disadvantage is caused by the oxidation, since the oxides thus formed fulfill a function as the sintering aids.

The temperature rise rate to an intended calcination temperature varies depending on the shape of the molding. Preferably, the rate is lowered as the size of the molding is increased. When the calcination is effected at a temperature of up to 1600° C., the sintering of the molding proceeds only slightly and, therefore, the temperature may be raised rapidly within, for example, one hour. However, when an oxide and a compound which is other than a metal and which is decomposable by heat are used as the sintering aids, a reaction due to heating proceeds in the low temperature calcination to emit a gas though a little. Therefore, the temperature rise is preferably slow. It is desirable to raise the temperature from room temperature to 1600° C. over 3 h or longer. Favorable results are obtained when the temperature is raised to an intended calcination temperature slowly at a rate of less than 7° C./min, since the molding shrinks when it is sintered at 1600° C. or higher temperature.

In case a rare earth element or its compound and a metal element or its compound are used, a compound is formed from the rare earth compound (mainly an oxide) and the metal element compound (mainly an oxide), if possible, in the sintered molding obtained in the course of the calcination. The compound thus formed reduces the surface energy of SiC to accelerate the sintering. In case such a compound is not formed, part of the rare earth element compound and the metal element compound (mainly an oxide) is dissolved in silicon carbide to form a solid solution and part of silicon carbide is dissolved in the rare earth element compound and metal element compound (mainly an oxide) to form a solid solution, whereby the sintering of the silicon carbide powder is accelerated. In case the rare earth element, metal element and carbon or their compounds are used as the sintering aids, carbon or its compound reacts with the rare earth element or its compound and $SiO_2$ on the silicon carbide surface during the calcination. Thus, a considerable part of them is gasified and discharged from the system and part of the balance thereof diffuses into silicon carbide. As a result, the silicon carbide surface is activated and the mutual diffusion of the rare earth element compound, metal element compound (mainly an oxide) and silicon carbide is facilitated by carbon in the solid solution in silicon carbide and the sintering reaction rate is increased. Only a small portion of added carbon remains in the sintered SiC molding to increase the strength and hardness of the sintered molding.

In case the rare earth element or its compound, at least one of aluminum, boron and their compounds and at least one of the metal elements or their compounds are used as the components of the sintering agent, the rare earth element or its compound reacts with aluminum, boron or its compound in the molding to form a compound or they form a solid solution. It is possible to react part of the metal element or its compound with the thus formed compound or to dissolve the former in the latter even only slightly to form a solid solution. As a matter of course, $SiO_2$ reacts with or forms a solid solution with the compound obtained by the above-mentioned reaction or the solid solution formed as above. Aluminum or boron in said compound or solid solution diffuses easily in silicon carbide and, consequently, the diffusion rate of silicon carbide in the rare earth compound (mainly an oxide) is increased. As a result, the sintering reaction rate higher than that obtained by using the rare earth element and metal element can be obtained. In a sintered molding obtained by using the rare earth element, metal element, aluminum, boron and carbon or their compounds as components of the sintering aid, the carbon, aluminum and boron have effects equivalent to those obtained when carbon, aluminum or boron is added to the rare earth element and the metal element. Thus, the additional effects are obtained and the improved calcination acceleration effects are obtained.

As the carbon and its compounds to be incorporated in the unsintered moldings, there may be used acetylene black, carbon black, graphite powder, charcoal powder, active carbon, high molecular weight aromatic compounds (such as tar and pitch) and organic compounds which form carbon residue after calcination (such as phenolic resin, aniline/formaldehyde resin, cresol/formaldehyde resin and furan resin).

It has been known that the above-mentioned carbon or its compounds incorporated in the unsintered molding reacts with $SiO_2$ present on the SiC powder surface to form SiC during the calcination and that $B_4C$ is formed therefore by reaction with boron to accelerate the sintering. When the sintering aid contains both carbon and boron, the sintering-accelerating effect of $B_4C$ are recognized partially even in the presence of the rare earth oxide. It is considered, therefore, that the more firmly sintered product can be obtained in such a case.

It is desirable that the carbon added has been reacted substantially completely before completion of the calcination to lower the free carbon residue content in the sintered molding. A sintered molding having a high free carbon content has a poor oxidation resistance at a high temperature and cannot be used advantageously at the high temperature.

In the present invention, the calcination may be effected either under pressure or without applying any particular pressure. Particularly, a molding having high density and strength can be obtained even in the latter case. In sintered moldings obtained in the prior art, $Al_2O_3$, $Fe_2O_3$, BeO, $B_4C$, etc. incorporated as sintering aids in the SiC powder remains in the particulate SiC texture, accordingly, the strength of the resulting moldings is considerably lower than the theoretical one. Particularly, the strength at a high temperature is reduced as the amount of the sintering aid is increased. It is desirable, therefore, that the amount of the sintering aid to be incorporated in the SiC powder is controlled to a low level for obtaining sintered moldings having a high strength, particularly at a high temperature.

According to the present invention, the major part of the sintering aid mixed with the SiC powder precipitates in the particulate texture, though part thereof is dissolved in SiC to form a solid solution. The precipitate in said texture reduces the brittleness of SiC which is a weak point of the sintered SiC molding. Part of this mechanism would be described below.

When $ZrO_2$ is incorporated in the sintering aid, part or the whole of $ZrO_2$ crystals precipitated in the particulate texture are tetragonal due to the effects of the R oxide, aluminum oxide and boron oxide. The tetragonal crystals are stable at a high temperature and metastable at room temperature. When a stress higher than a given level is applied externally to the sintered SiC molding, small cracks are formed inside the molding. The tetragonal crystals absorb the breaking energy of the cracks and the transition thereof into monoclinic crystals occurs. Consequently, the enlargement of the small cracks is inhibited and the sintered SiC molding becomes resistant to a higher stress. When $Fe_2O_3$ is incorporated in the sintering aid, it is precipitated in the form of slim fibers in the particulate texture due to the effects of the R oxide, aluminum oxide and boron oxide. When a stress higher than a given level is applied externally to the sintered molding, small cracks are formed inside the product. The fibrous oxide scatters the direction and the breaking energy of the cracks to inhibit the enlargement of the cracks. Consequently, the sintered SiC molding becomes resistant to a higher stress. In some cases, both of the above-mentioned two mechanisms are realized to exhibit a greater crack enlargement-inhibiting effect, whereby the brittleness of SiC is reduced remarkably. The oxide precipitate in the particulate texture has an effect of reducing the brittleness of the sintered SiC molding. However, when the amount of the oxide is increased, the strength and hardness of the product become lower than those of SiC. This inclination is remarkable particularly at a high temperature. On the other hand, when the amount of the sintering aid is decreased, the reduction in brittleness is insignificant and the sintering properties of the product becomes poor and the sintering without application of any pressure becomes difficult, though the strength and hardness are substantially equivalent to those of SiC and reduction in the strength and hardness at a high temperature is slight.

When the sintering aid is used in an amount smaller than that mentioned above, it is advantageous to effect the calcination under pressure to complement the self-sintering capacity. This calcination may be effected by ordinary hot press, hot isostatic press or atmosphere compression calcination method.

Now, the description will be made on reasons why the components of the molding must be limited.

In the sintered silicon carbide molding in the first invention, the R oxide content should be controlled in the range of 0.30 to 30.00 weight %, since with less than 0.30 weight % of the R oxide, the production of a sintered product having a high strength is difficult and, on the other hand, with more than 30.00 weight % of the R oxide, the SiC content of the sintered molding becomes insufficient and the production of a molding having a high strength becomes difficult. The M oxide content should be controlled in the range of 0.30 to 30.00 weight %, since with less than 0.30 weight % of the M oxide, the resulting effects are only equivalent to those obtained when the R oxide is used alone as the sintering aid and the improvement in the properties, particularly tenacity, of the sintered molding is insufficient and, on the other hand, with more than 30.00 weight % of the M oxide, the SiC content of the sintered molding becomes insufficient and the resulting product has a poor strength.

The sum of R oxide and M oxide should be controlled not more than 40.00 weight %, since with more than 40 weight % of the sum, the SiC content of the sintered molding becomes insufficient and the production of a molding having a high strength becomes difficult.

In the sintered silicon carbide molding in the second invention, the R oxide content should be controlled in the range of 0.30 to 30.00 weight %, since with less than 0.30 weight % of the R oxide, the production of a sintered molding having a high strength is difficult and, on the other hand, with more than 30.00 weight % of the R oxide, the SiC content of the sintered molding becomes insufficient and the production of a molding having a high strength becomes difficult.

The amount of aluminum and/or boron oxide in the molding should be controlled in the range of 0.30 to 10.00 weight %, since with less than 0.30 weight % thereof, no sintered molding having a sufficient strength can be obtained and, on the other hand, with more than 10.00 weight % thereof, the SiC content of the sintered molding becomes insufficient and no sintered molding having a satisfactory strength can be obtained. The M oxide content should be controlled in the range of 0.30 to 30.00 weight %, since with less than 0.30 weight % of the M oxide, the improvement in the properties, particularly tenacity, of the sintered molding is insufficient and, on the other hand, with more than 30.00 weight % of the M oxide, the SiC content of the sintered molding becomes insufficient and the resulting product has a poor strength.

The sum of R oxide, M oxide and oxides of Al and/or B should be controlled not more than 40 weight %.

The amount of the sintering aid to be added to the SiC powder is as follows: in using the sintering aid comprising up to 99.9 wt.% of the above-mentioned component (I)-(a) and the balance substantially consisting of component (b), when the sum of the amount of the elements (as oxides) constituting the sintering aid, i.e., the rare earth element(s) or compound(s) thereof (group (a)) and the metal element(s) or compound(s) thereof (group (b)) and that of SiC is taken as 100 weight %, the amounts of the components (a) and (b) (as oxides) should be controlled in the ranges of 0.30 to 30.00% by weight and 0.30 to 30.00%, by weight respectively. When the amount of group (a) is less than 0.30% by weight or more than 30.00% by weight, the amount of SiC remaining in the sintered molding becomes small and, therefore, no sintered molding having a high strength can be obtained. When the amount of group (b) is less than 0.30% by weight, the sintered molding has insufficient properties, particularly poor tenacity. On the other hand, when the amount is more than 30.00% by weight, the amount of SiC remaining in the sintered molding becomes small and the strength thereof is reduced.

In using the sintering aid comprising up to 99.9 wt.% of the above-mentioned component (II)-(a), up to 99 wt.% of the component (c) and the balance substantially consisting of component (b), when the sum of the amount of the elements (as oxide) constituting the sintering aid, i.e., the components (a) and (b) and Al, B and/or C or compound(s) thereof (c) and that of SiC is taken as 100% by weight, the amounts of the components (a), (b) and (c) should be controlled in the ranges of 0.30 to 30.00% by weight, 0.30 to 30.00 by weight, and 0.30 to 10.00% by weight, respectively. Outside these ranges, it becomes impossible to obtain the sintered molding having a satisfactory strength.

Though the sintered SiC molding of the present invention comprises the above-mentioned components, impurities contained in the starting SiC used for the production of the sintered silicon carbide molding according to the present invention are naturally contained in the final molding of the present invention. Therefore, the sintered silicon carbide moldings thus containing impurities are also included in the present invention.

The following examples will further illustrate the present invention.

EXAMPLE 1

1 g of scandium oxide, 1 g of aluminum oxide and 1 g of iron oxide were added to 27.0 g of α-SiC having an average particle size of 0.40 μm. After adding alcohol thereto, the mixture was stirred in an agate mortar for 3 h. The resulting powdery mixture was dried, charged in a mold and molded by means of a double-force press to obtain an unsintered molding. The molding thus formed was heated to 1850° C. by raising the temperature at a rate of 200° C./h using a graphite heating element in argon atmosphere in a Tammann furnace and maintained at 1850° C. for 1 h to obtain a sintered silicon carbide molding. This product had a linear shrinkage coefficient of 15% and a specific gravity of 3.14. The bending strength of the product was determined according to threepoint bending method with a span of 20 mm at a loading rate of 0.5 mm/min. The bending strength was 85 kg/mm$^2$ at room temperature, 65 kg/mm$^2$ at 1100° C. and 75 kg/mm$^2$ at 1400° C.

The molded product had an excellent oxidation resistance at a high temperature. After an oxidation test carrried out at the 1350° C. in oxygen for 100 h, the weight gain was hardly recognized. The m value determined from Weibull-plot was 10.

EXAMPLE 2

9 g of yttrium oxide was dissolved in 180 ml of a 2 N hydrochloric acid solution. 40 ml of aqueous ammonia was added to the solution to precipitate yttrium hydroxide, which was filtered out. Yttrium hydroxide thus obtained was added to 260 ml of a formic acid solution having a pH of 2 and the mixture was stirred at room temperature for 3 h to react the hydroxide with formic acid. The reaction solution was concentrated under reduced pressure and then dried in vacuum to obtain 18.5 g of an acid adduct of yttrium hydroxide. Separately, 30 g of aluminum isopropoxide was dissolved in 120 ml of benzene. 200 ml of a 1 N hydrochloric acid solution was added to the solution. Aluminum hydroxide thus formed was immediately reacted with hydrochloric acid and the all reactions were completed in several hours. The aqueous solution portion of the reaction solution was concentrated under reduced pressure and dried in vacuum to obtain 20 g of an acid adduct of aluminum hydroxide. 1.5 g of the acid adduct of yttrium hydroxide and 1.5 g of the acid adduct of aluminum hydroxide were dissolved in water. 6 g of ZrO$_2$ having an average particle diameter of 0.5 μm and 21 g of β-SiC (containing 5% of α-SiC) having an average particle diameter of 0.27 μm were added to the solution. The mixture was stirred, water was evaporated and the residue was dried. The thus obtained dry powder was charged in a mold having a size of 8×36 mm and molded by means of a double-force press to obtain an unsintered molding. The molding thus formed was calcined by raising the temperature to 500° C. at a rate of 100° C./h in air. Then, it was further calcined by raising the temperature to 1400° C. at a rate of 200° C./h in nitrogen stream. The shape of the molding was regulated. The molding thus calcined at 1400° C. was charged in a graphite crucible. α-SiC powder having 100 μm particle size was charged around the sample in the crucible. The temperature was raised to 1900° C. at a rate of 200° C./h by means of a high-frequency oscillator. The molding was maintained at 1900° C. for 30 min to obtain a sintered silicon carbide molding. The product had a specific gravity of 3.17 and a bending strength at room temperature of 90 kg/mm$^2$. It was found that the silicon carbide molding had excellent tenacity, oxidation resistance, thermal shock resistance and creep resistance. The m value determined from Weibull-plot was 12.

EXAMPLE 3

Aluminum yttrium oxide (Al$_2$Y$_4$O$_9$) (a compound oxide) was pulverized to a particle size of up to 2 μm. 2 g of this powder was mixed with 1 g of beryllium oxide and 97 g of α-SiC having an average particle diameter of 0.4 μm. The mixture was stirred thoroughly in a mixer. The powdery mixture was charged in a graphite mold having an inner diameter of 35 mm. The temperature was raised to 1900° C. at a rate of 10° C./min by means of a high frequency oscillator under a pressure of 200 kg/cm$^2$. The temperature was maintained at 1850° C. for 2 h to complete the hot pressing. The sintered silicon carbide molding thus obtained had a specific gravity of 3.18. This product had a bending strength at room temperature of 99 kg/mm$^2$. A high-temperature strength of the product at 1400° C. was lower than the strength at room temperature by only 7%. The m value determined from Weibull-plot was 11.

EXAMPLE 4

3 g of aluminum sulfate was dissolved in water. 81 g of α-SiC having an average particle diameter of 1 μm and 10 g of calcium oxide were added to the solution. They were stirred in a mixer for 1 h and dried. 6 g of lanthanum triacetylacetonate was dissolved in benzene. The dry powder obtained as above was added to the solution and they were stirred thoroughly. Benzene was evaporated and the residue was left to stand in air for 5 days to obtain a powdery mixture. The powdery mixture was charged in an 8×36 mm mold and molded by means of a double-force press to obtain a molding. The unsintered molding thus formed was calcined by raising the temperature to 600° C. at a rate of 100° C./h in air and then the temperature was raised to 1400° C. at a rate of 200° C./h to continue the calcination. The molding was charged in a graphite crucible and the temperature was raised from 1400° C. to 1900° C. at a rate of 200° C./h by means of a high-frequency oscillator. The molding was maintained at 1900° C. for 30 min to obtain a sintered silicon carbide molding. The product had a specific gravity of 3.11 and a bending strength at room temperature of 85 kg/mm$^2$. The m value determined from Weibull-plot was 10.

EXAMPLE 5

10 g of cerium isopropoxide, 25 g of aluminum isopropoxide and 10 g of titanium isoporpoxide were dissolved in benzene. 290 g of β-SiC (containing 5% of α-SiC) having an average particle diameter of 0.27 μm was added to the solution. After thorough stirring with a small kneader, benzene was evaporated and the residue was dried. The resulting dry powder was left to stand in air for 3 days, charged in a mold having 20 mm diameter and molded by means of a single-force press. The resulting molding was placed in a rubber tube and compressed by means of a hydrostatic press using water as a pressure medium to obtain an unsintered molding. This molding was sintered by raising the temperature to 500° C. at a rate of 100° C./h in air and then the temperature was raised to 1400° C. at a rate of 200° C./h in argon atmosphere to continue the calcination. Thereafter, the molding was heated to 2000° C. at a rate of 200° C./h in argon atmosphere in a Tammann furnace to effect the calcination. This product had a linear shrinkage coefficient of 16% based on the molding sintered at 500° C. The sintered silicon carbide molding had a specific gravity of 3.15 and a bending strength at room temperature of 90 kg/mm$^2$. The m value determined from Weibull-plot was 12.

EXAMPLE 6

5 g of praseodymium sulfate and 4 g of vanadium nitrate were dissolved in water. 80 g of β-SiC (containing 5% of α-SiC) having an average particle diameter of 0.27 μm was added to the solution and the mixture was stirred thoroughly. Water was evaporated and the residue was dried. The resulting dry powder was charged in a mold and molded by means of a double-force press. The resulting unsintered molding was calcined by raising the temperature to 500° C. at a rate of 100° C./h and then the temperature was raised to 1400° C. at a rate of 200° C./h in nitrogen stream to continue the calcination. Thereafter, the molding calcined at 1400° C. was placed in a graphite crucible. After closing the crucible, the molding was calcined by means of a high-frequency oscillator. In this step, the temperature was raised from 1400° C. to 1900° C. at a rate of 200° C./h. The molding was maintained at 1900° C. for 2 h to complete the calcination, whereby a sintered silicon carbide molding was obtained. The product had a specific gravity of 3.08 and a bending strength at room temperature of 85 kg/mm$^2$. The m value determined from Weibull-plot was 11.

EXAMPLE 7

3 g of the acid adduct of yttrium hydroxide and 3 g of the acid adduct of aluminum hydroxide synthesized in Example 2 were dissolved in water. 20 g of α-SiC having an average particle diameter of 1 μm and 7 g of niobium oxide were added to the solution and the mixture was stirred. Water was evaporated to obtain a dry powder. The dry powder was charged in a mold and molded to obtain an unsintered molding having 30 mm diameter and 5 mm thickness. The unsintered product was calcined by raising the temperature to 500° C. at a rate of 100° C./h. The molding thus calcined at 500° C. was heated to 1950° C. at a rate of 400° C./h and maintained at 1950° C. for 30 min to obtain a sintered molding. The sintered molding had a density of 3.06 and a bending strength of 73 kg/mm$^2$. The m value determined from Weibull-plot was 10.

EXAMPLE 8

2 g of metallic lanthanum, 1 g of metallic boron and 4 g of metallic molybdenum were pulverized and then added to 93 g of β-SiC powder (containing 5% of α-SiC). The mixture was stirred in an agate mortar for 1 h. The resulting powdery mixture was charged in a mold having a size of 8×36 mm and compression-molded by means of a double-force press to obtain an unsintered molding. The unsintered molding was placed in a Tammann furnace. The temperature was raised from room temperature to 1600° C. at a rate of 300° C./h in vacuum ($1\times10^{-3}$ mmHg), then from 1600° C. to 2000° C. at a rate of 200° C./h by means of a graphite heating element. The molding was maintained at 2000° C. for 2 h to obtain a sintered silicon carbide molding. This product had a bending strength of 70 kg/mm$^2$ and a specific gravity of 3.11.

EXAMPLE 9

9 g of cerium nitrate was dissolved in water. 1 g of carbon black, 86 g of α-SiC having an average particle diameter of 1 μm and 4 g of cobalt oxide were added to the solution. The mixture was stirred in a mixer for 3 h. After completion of the stirring, the mixture was dried and charged in a graphite mold having 50 mmφ. The temperature was raised to 2000° C. in 2 h by means of a high-frequency oscillator under a pressure of 250 kg/cm$^2$. The molding was maintained at 2000° C. for 30 min to complete the hot pressing. The resulting sintered molding had a density of 3.14 and a bending strength of 80 kg/mm². The m value determined from Weibull-plot was 14.

EXAMPLE 10

4 g of lutetium acetylacetonate and 6 g of barium isopropoxide were dissolved in benzene. 3 g of boron oxide, 2 g of carbon black and 85 g of α-SiC having an average particle diameter of 1 μm were added to the solution. The mixture was stirred in a mixer for 2 h. Benzene was evaporated and the residue was dired. The resulting dry powder was charged in a mold and compression-molded by means of a double-force press to obtain an unsintered molding. This product was calcined by raising the temperature to 1400° C. at a rate of 200° C./h in nitrogen gas in a resistance furnace. The molding thus calcined at 1400° C. was heated to 1950° C. at a temperature rise rate of 200° C./h in argon gas atmosphere in a Tammann furnace to obtain a sintered silicon carbide molding. This product had a specific gravity of 3.12 and a bending strength at room temperature of 73 kg/mm². The m value determined from Weibull-plot was 11.

EXAMPLE 11

10 g of gadolinium oxide was dissolved in 250 ml of a 2 N hydrochloric acid solution. 40 ml of aqueous ammonia was added to the solution to precipitate gadolinium hydroxide. The gadolinium hydroxide precipitate was added to 220 ml of a 1 N acetic acid solution and the reaction was carried out for 5 h. Water was evaporated off to obtain an acid adduct of gadolinium hydroxide. 10 g of this adduct and 10 g of the acid adduct of aluminum hydroxide synthesized in Example 2 were dissolved in water. 70 g of β-SiC (containing 5% of α-SiC) having an average particle diameter of 0.27 μm and 10 g of tantalum oxide were added to the solution and they were mixed in a mixer for 2 h. The resulting powdery mixture was dried in a dryer, charged in a graphite mold and heated to 1900° C. at a temperature rise rate of 9° C./min by means of a high-frequency oscillator in argon atmosphere under a pressure of 250 kg/cm². The molding was maintained at 1900° C. for 30 min to obtain a sintered molding. This product had a density of 3.19 and an average bending strength of 75 kg/mm². The m value determined from Weibull-plot was 15. The product had a tenacity higher than that of known SiC moldings.

EXAMPLE 12

10 g of dysprosium chloride was dissolved in water. 80 g of α-SiC having an average particle diameter of 1 μm, 3 g of aluminum oxide and 7 g of tungsten oxide were added to the solution. They were mixed in a mixer for 1 h and dried by leaving the same in air. The resulting powder was charged in a graphite mold and heated to 1950° C. at a temperature rise rate of 10° C./min by means of a high-frequency oscillator in nitrogen atmosphere under 250 kg/cm² pressure. The molding was maintained at 1950° C. for 30 min to obtain a sintered SiC molding. This product had a density of 3.16 and an average bending strength of 85 kg/mm². The m value determined from Weibull-plot was 13.

EXAMPLE 13

12 g of holmium nitrate and 2 g of boric acid were dissolved in water. 84 g of β-SiC (containing 5% of α-SiC) having an average particle diameter of 0.27 μm and 2 g of lithium carbonate were added to the solution. They were mixed in a mixer for 1 h. The resulting mixture was dried by leaving the same in air and then pulverized. The resulting powder was charged in a mold and compression-molded by means of a double-force press to obtain an unsintered molding. This molding was calcined by raising the temperature to 500° C. at a rate of 100° C./h in air and then to 1400° C. at a rate of 200° C./h in nitrogen gas. The molding thus calcined at 1400° C. was charged in a graphite crucible. The graphite crucible was heated from 1400° C. to 1950° C. at a temperature rise rate of 400° C./h by means of a high-frequency oscillator. The molding was maintained at 1950° C. for 1 h to obtain a sintered silicon carbide molding. This product had a specific gravity of 3.08 and a bending strength of 70 kg/mm². The m value determined from Weibull-plot was 11.

EXAMPLE 14

10 g of cerium acetylacetonate, 2 g of erbium acetylacetonate and 2 g of nickel isopropoxide were dissolved in benzene. 1.5 g of carbon black and 84.5 g of β-SiC (containing 5% of α-SiC) having an average particle diameter of 0.27 μm were added to the solution. They were mixed in a mixer for 30 min. Benzene was evaporated from the mixture and the residue was pulverized. The powder thus obtained was left to stand in air for 2 days. The powder was charged in a mold and compression-molded by means of a double-force press to obtain an unsintered molding. This molding was calcined by heating to 1400° C. at a temperature rise rate of 200° C./h in nitrogen gas. The molding thus calcined at 1400° C. was charged in a graphite crucible. The temperature was elevated from 1400° C. to 1900° C. at a rate of 400° C./h and the molding was maintained at 1900° C. for 1 h to obtain a sintered silicon carbide molding. This product had a specific gravity of 3.12 and a bending strength of 75 kg/mm². The m value determined from Weibull-plot was 10.

EXAMPLE 15

22 g of lanthanum oxide was dissolved in 160 ml of 2 N hydrochloric acid. 30 ml of aqueous ammonia was added to the solution to precipitate lanthanum hydroxide. The precipitate was filtered, dried and dissolved in 280 ml of a 1 N hydrochloric acid solution. The solution was concentrated to obtain an acid adduct of lanthanum hydroxide. 6 g of this acid adduct was dissolved in water. 1.5 g of carbon black, 87 g of α-SiC having an average particle diameter of 1 μm and 5.5 g of MgO were added to the solution and they were mixed in a mixer for 3 h. Water was evaporated and the mixture was pulverized. A powder thus obtained was charged in a mold and compression-molded by means of a double-force press to obtain an unsintered molding. This molding was calcined by heating to 1400° C. at a temperature rise rate of 100° C./h. The molding calcined at 1400° C. was placed in a graphite crucible. The temperature was raised from 1400° C. to 1900° C. at a rate of 300° C./h by means of a highfrequency oscillator. The molding was maintained at 1900° C. for 1 h to obtain a sintered silicon carbide molding. This product had a specific gravity of 3.08 and a bending strength of 70 kg/mm².

As described above, the sintered silicon carbide molding of the present invention has high density and strength and excellent oxidation resistance, abrasion resistance, creep resistance and thermal shock resistance. The electric resistance of the molding varies form $10^{-1}\Omega\cdot cm$ to $10^{12}\Omega\cdot cm$ depending on the amount and variety of the sintering aid. Thus, the sintered silicon carbide moldings of the present invention have a quality higher than that of the conventional products. According to the present invention, moldings having complicated shapes, hollow moldings and thin belts can be produced directly by a conventional technique. This fact is economically advantageous. The sintered silicon carbide moldings of the present invention may be used as gas turbine blades, spherical bodies, gas turbine parts, parts of devices for corrosive liquids, crucibles, liners for ball mills, heat exchangers and refractory materials for high-temperature furnace, electric heating elements, combustion tubes, die casting pumps, thin tubes, materials for nuclear fusion reactors, materials for nuclear reactors, materials for solar furnaces, industrial tools and parts thereof, abrasives, heat insulators, bases for single crystals, IC substrates, varistors, or the like.

What is claimed is:

1. A sintered silicon carbide molding having a bending strength of at least 70 $Kg/mm^2$ at room temperature, a m value determined from Weibull-plot of no less than 10 and a ratio of bending strength at 1400° C. to that at room temperature of not less than 0.85, wherein said molding consists of 0.30 to 30.00 weight % of oxide(s) of the following group (a) and 0.30 to 30.00 weight % of oxide (s) of the following group (b), sum of the oxides in the groups (a) and (b) being not more than 40 weight % and the balance substantially consisting of silicon carbide:
   - group (a): oxide(s) of at least one element selected from the group consisting of Sc, Y, La, Ce, Pr, Nd, Sm, Eu, Gd, Tb, Dy, Ho, Er, Tm, Yb, Pm and Lu, and
   - group (b): oxide(s) of at least one element selected from the group consisting of Be, Mg, Ca, Ti, V, Cr, Mn, Fe, Co, Ni, Zn, Sr, Zr, Nb, Mo, Ba, Tc, Ta, W and Th.

2. A high strength sintered silicon carbide molding having a bending strength of at least 70 $Kg/mm^2$ at room temperature, a m value determined from Weibull-plot of not less than 10 and a ratio of bending strength at 1400° C. to that at room temperature of not less than 0.85, wherein said molding consists of 0.30 to 30.00 weight % of oxide(s) of the following group (a), 0.30 to 30.00 weight % of oxide (s) of group (c), sum of the oxides of groups (a), (b) and (c) being not more than 40 weight % and the balance substantially consisting of silicon carbide:
   - group (a): oxide(s) of at least one element selected from the group consisting of Sc, Y, La, Ce, Pr, Nd, Sm, Eu, Gd, Tb, Dy, Ho, Er, Tm, Yb, Pm and Lu,
   - group (b): oxide(s) of at least one element selected from the group consisting of Be, Mg, Ca, Ti, V, Cr, Mn, Fe, Co, Ni, Zn, Sr, Nb, Mo, Ba, Tc, Ta, W and Th, and
   - group (c): oxide(s) of at least one of elements Al and B.

* * * * *